(12) United States Patent
Cates (10) Patent No.: US 7,904,754 B2
(45) Date of Patent: Mar. 8, 2011

(54) SYSTEMS AND METHODS FOR AUTOMATED DETERMINATION OF OUT OF MEMORY HANDLING

(75) Inventor: Claire Cates, Carolina Beach, NC (US)

(73) Assignee: SAS Institute Inc., Cary, NC (US)

( * ) Notice: Subject to any disclaimer, the term of this patent is extended or adjusted under 35 U.S.C. 154(b) by 213 days.

(21) Appl. No.: 12/406,363

(22) Filed: Mar. 18, 2009

(65) Prior Publication Data

US 2010/0241908 A1 Sep. 23, 2010

(51) Int. Cl.
*G06F 11/00* (2006.01)
(52) U.S. Cl. .................. 714/33; 714/28; 714/45; 703/21
(58) Field of Classification Search .................. 714/28, 714/32, 33, 45; 703/20, 21, 22
See application file for complete search history.

(56) References Cited

U.S. PATENT DOCUMENTS

| | | | |
|---|---|---|---|
| 5,724,590 A | 3/1998 | Goettelmann et al. | |
| 5,732,272 A | 3/1998 | Gochee | |
| 5,828,883 A | 10/1998 | Hall | |
| 5,963,739 A | 10/1999 | Homeier | |
| 6,096,089 A * | 8/2000 | Kageshima | 703/18 |
| 6,560,773 B1 | 5/2003 | Alexander, III et al. | |
| 6,598,105 B1 * | 7/2003 | Oshins et al. | 710/264 |
| 6,678,883 B1 * | 1/2004 | Berry et al. | 717/128 |
| 6,718,485 B1 * | 4/2004 | Reiser | 714/38 |
| 6,782,462 B2 | 8/2004 | Marion et al. | |
| 6,912,675 B2 * | 6/2005 | Swoboda | 714/45 |
| 7,079,688 B1 | 7/2006 | Deco et al. | |
| 7,093,241 B2 | 8/2006 | Huang et al. | |
| 7,167,821 B2 * | 1/2007 | Hardwick et al. | 703/22 |
| 7,184,944 B1 * | 2/2007 | Rieschl et al. | 703/21 |
| 7,257,692 B2 | 8/2007 | Schumacher | |
| 7,292,969 B1 * | 11/2007 | Aharoni et al. | 703/21 |
| 7,409,679 B2 | 8/2008 | Chedgey et al. | |
| 7,506,319 B2 | 3/2009 | Purcell et al. | |
| 7,509,632 B2 | 3/2009 | Boger | |
| 7,512,765 B2 * | 3/2009 | Kurtz | 711/170 |
| 7,590,894 B2 * | 9/2009 | Swoboda et al. | 714/45 |
| 2003/0056199 A1 | 3/2003 | Li et al. | |
| 2005/0114843 A1 | 5/2005 | Gilgen et al. | |
| 2005/0183075 A1 | 8/2005 | Alexander et al. | |
| 2005/0235127 A1 | 10/2005 | Muthiah et al. | |
| 2006/0085156 A1 | 4/2006 | Kolawa et al. | |
| 2007/0011428 A1 | 1/2007 | Kurtz | |

(Continued)

OTHER PUBLICATIONS

Ayers, Andrew et al., "TraceBack: First Fault Diagnosis by Reconstruction of Distributed Control Flow", PLDI '05, pp. 201-212 (Jun. 12-15, 2005).

(Continued)

*Primary Examiner* — Joshua A Lohn
(74) *Attorney, Agent, or Firm* — Jones Day (57) ABSTRACT

Systems and methods for automatic determination of out of memory handling situations are provided. A system and method can include receiving data that includes one or more memory allocations or one or more pool heaps and running a test on the data to capture one or more tracebacks. If the one or more tracebacks are unique, then the one or more unique tracebacks are added to a list. The test is run a second time on the first traceback on the list to determine a result that indicates correct execution or incorrect execution with respect to memory handling. The result is stored in a computer-readable storage medium.

17 Claims, 12 Drawing Sheets

U.S. PATENT DOCUMENTS

| | | | |
|---|---|---|---|
| 2007/0169051 A1 | 7/2007 | Krauss | |
| 2008/0177526 A1* | 7/2008 | Kano et al. | 703/22 |
| 2009/0210750 A1* | 8/2009 | Cates | 714/42 |
| 2010/0106933 A1* | 4/2010 | Kamila et al. | 711/171 |
| 2010/0218149 A1* | 8/2010 | Sasaki | 716/5 |
| 2010/0241908 A1* | 9/2010 | Cates | 714/45 |
| 2010/0281303 A1* | 11/2010 | Cates | 714/33 |

OTHER PUBLICATIONS

OC Systems Aprobe Technology, http://www.ocsystems.com/tech_aprobe.html, 2 pp.

OC Systems, RootCause Speeds Resolution of Performance Bottlenecks, Memory Leaks and . . . , http://www.ocsystems.com/prod_rootcause.html (2 pp.).

OC Systems SAS RootCause Client Profile, http://www.ocsystems.com/casestudy_sas.html, 2 pp.

Hitchhiker Lifecycle Application Diagnostics for C/C++, http://www.ocsystems.com/eclipse/index.html, 2 pp.

Undated paper entitled "How's Your Memory" by Claire Cates at SAS (10 pp.).

Ammons, Glen et al., "Finding and Removing Performance Bottlenecks in Large Systems", undated, 26 pp.

Begic, Goran, "An introduction to runtime analysis with Rational PurifyPlus", Nov. 19, 2003, 11 pp.

Chilimbi, Trishul M. et al., "Low-Overhead Memory Leak Detection Using Adaptive Statistical Profiling", ASPLOS '04, Oct. 9-13, 2004, pp. 156-164.

Cole, Oliver, "Aprobe: A Non-intrusive Framework for Software Instrumentation", OC Systems, Inc., pp. 1-10.

Jump, Maria et al., "Cork: Dynamic Memory Leak Detection for Java", Technical Report TR-06-07, Jan. 2006, 10 pp.

Pevzner, P.A. et al., "Multiple Filtration and Approximate Pattern Matching", Algorithmica, 13, pp. 135-154 (1995).

Williams, Amy Lynne, "Static Detection of Deadlock for Java Libraries", Massachusetts Institute of Technology, 67 pp. (2005).

Spivey, J.M., "Fast, accurate call graph profiling", Software Practice and Experience, vol. 34, Issue 3, pp. 249-264 [2004].

Xie, Tao et al., "An Empirical Study of Java Dynamic Call Graph Extractors", University of Washington Technical Report, pp. 1-11 [Feb. 12, 2003].

* cited by examiner

```
C:\memory>
C:\memory>
C:\memory>
C:\memory> ria -config\null.cfg

C:\memory> rcnull \\tstsrc\tst\dev\tst-v920\tkeds\testsrc\d2elar27.sas -only TKED
SExecute -autoexec \\tstsrc\tst\dev\tst-v920\tkeds\testsrc\d2auto.sas C:\memory> echo off
Registry updated.
Adding Program: "C:\SASv9\sasgen\dev\mva-v920\sas_dvd\com\dntno\sas.exe" (c:\SAS
v9\sasgen\dev\mva-v920\sas_dvd\com\dntno\sas.exe) -> "c:\probes\null.aws"
Registry updated.
RootCause registry found and RootCause is ENABLED
For registered applications.
------------
Null probe active
------------
Executing rcnull on file \\tstsrc\tst\dev\tst-v920\tkeds\testsrc\d2elar27.sas sdssas xyzdgf.sas -autoexec \\tstsrc\tst\dev\tst-v920\tkeds\testsrc\d2auto.sas
DNT/SDSSAS Version 4.0-08-0529.0918
NOTE <sdssas>: STARTED ....  2008/06/04.11:34:30
NOTE <sdssas>: ISERVER ....  yosemite:anvil
NOTE <sdssas>: IMGTO ....  10
NOTE <sdssas>: WARNING ....  Using tag=m901 for GISMAPS!
NOTE <sdssas>: PLAYPEN ....  -path           C:\memory\com\dntno
NOTE <sdssas>: PLAYPEN ....  -resourcesloc   C:\memory\com\dntno
Invoking SAS, dev/mva-v920.dntno.DVD [dev/mva-v920/dntno/sas_dvd sas.exe] ...
C:\SASv9\sasgen\dev\mva-v920\sas_dvd\com\dntno\sas.exe xyzdgf.sas -config C:\SAS
v9\tmp\SASv9-2180.cfg -sashost C:\SASv9\sasgen\dev\mva-v920\sas_dvd\com\dntno\sa
shost.dll -autoexec \\tstsrc\tst\dev\tst-v920\tkeds\testsrc\d2auto.sas
```

MATCH TO FIG. 6B

```
MATCH TO FIG. 6A
3 tkeds.dll:/sas/dev/mva-v920/tkeds/src/tkeds.c:TKEDSExecute()     1150
4 tkedsq.dll:/sas/dev/mva-v920/tkeds/src/tkedsq.c:TKEDSQExecNoRows()  589
11
Connected Process has terminated
================================================
A CONNECTION TO A NEW sas.exe INSTANCE HAS BEEN INITIATED
--------Starting the NULL Probe--------
Excluding any traceback contained in v920.filt
restart #2
1 complete    0 not found    156 unique allocations
Null pointer returned thread=tssql-worker-bee_21 size alloc=896 alloc #=84768 orig #=26087
Exception 4 Access Violation
0 Address 0x0e8b08ff, is not in a loaded image
1 tkeds.dll:/sas/dev/mva-v920/tkeds/src/tkeds.c:TKEDSExecute()     1188
2 tkeds.dll:/sas/dev/mva-v920/tkeds/src/tkeds.c:TKEDSExecute()     1171
3 tkeds.dll:/sas/dev/mva-v920/tkeds/src/tkeds.c:TKEDSExecute()     1150
4 tkedsq.dll:/sas/dev/mva-v920/tkeds/src/tkedsq.c:TKEDSQExecNoRows()  589
11
Connected Process has terminated
================================================
A CONNECTION TO A NEW sas.exe INSTANCE HAS BEEN INITIATED
--------Starting the NULL Probe--------
Excluding any traceback contained in v920.filt
restart #3
2 complete    0 not found    156 unique allocations
```

MATCH TO FIG.7B

MATCH TO FIG.7A

```
6 complete   0 not found   156 unique allocations
Null pointer returned thread=tssql-worker-bee_33 size alloc=8 alloc #=119577 orig #=26092
7 complete   0 not found   156 unique allocations
Null pointer returned thread=tssql-worker-bee_39 size alloc=8 alloc #=136977 orig #=26093
8 complete   0 not found   156 unique allocations
Null pointer returned thread=tssql-worker-bee_45 size alloc=8 alloc #=154379 orig #=26094
9 complete   0 not found   156 unique allocations
Null pointer returned thread=tssql-worker-bee_51 size alloc=8 alloc #=171782 orig #=26095
10 complete   0 not found   156 unique allocations
Null pointer returned thread=tssql-worker-bee_57 size alloc=4 alloc #=189186 orig #=26096
11 complete   0 not found   156 unique allocations
```

701

Host - d15002   NUM

Ready

MATCH TO FIG.8A

```
151 complete  0 not found  156 unique allocations
Null pointer returned thread=tssql-worker-bee_57 size alloc=92 alloc #=189208 orig #=26164
152 complete  0 not found  156 unique allocations
Null pointer returned thread=tssql-worker-bee_63 size alloc=100 alloc #=206594 orig #=26170
153 complete  0 not found  156 unique allocations
Null pointer returned thread=tssql-worker-bee_69 size alloc=92 alloc #=223972 orig #=26171
154 complete  0 not found  156 unique allocations
Null pointer returned thread=tssql-worker-bee_75 size alloc=628 alloc #=241350 orig #=26172
155 complete  0 not found  156 unique allocations
Null pointer returned thread=tssql-worker-bee_81 size alloc=92 alloc #=258739 orig #=26186
111
Connected Process has terminated
==================================================
```

801

Host - dl5002    NUM

Ready

*Fig. 8B*

SYSTEMS AND METHODS FOR AUTOMATED DETERMINATION OF OUT OF MEMORY HANDLING

TECHNICAL FIELD

The present disclosure relates generally to computer-implemented systems and methods for handling computer memory, and more specifically for automated determination of out of memory situations.

BACKGROUND

Memory utilization demands within computer systems have increased dramatically as a result of attempting to satisfy computer resource consumption needs of their users. Memory utilization demands cause problems within the computer systems, such as out of memory situations. For example, out of memory situations can occur in complex computer systems that handle numerous users. When an out of memory situation occurs, a computer system can react in different and often unpredictable ways. In some instances, the computer system may be able to repair itself and continue operations, but in other instances, the out of memory situation can cause the computer system to crash.

Instances of memory allocation can be checked by limiting the amount of memory available in a computer system and monitoring how the computer system reacts. However, handling memory allocations in this way often results in only a limited number of instances of memory allocation being checked in the computer system. Accordingly, many instances of memory allocation in the computer system may be unchecked. Still further, the reasons for why the computer system ran out of memory and where the computer system ran out of memory remain uncertain.

SUMMARY

In accordance with the teachings provided herein, systems and methods for operation upon data processing devices are provided to automatically determine out of memory situations. For example, a system and method can be configured to receive data that includes one or more memory allocations or one or more pool heaps and configured to run a test on the data to capture one or more tracebacks. If the one or more tracebacks are unique, then the one or more unique tracebacks are added to a list. The test is run a second time on the first traceback on the list to determine a result that indicates correct execution or incorrect execution with respect to memory handling. The result is stored in a computer-readable storage medium. The system and method can be further configured to identify a reason for an out of memory situation, wherein the reason is generated by analyzing one or more of the tracebacks when a system fault or a system lockup occurs. As an illustration, the reason for the incorrect execution can indicate that the incorrect execution arose because an application did not properly handle a null pointer.

BRIEF DESCRIPTION OF THE DRAWINGS

FIG. 5 shows an example display of a test for specific tracebacks.

Like reference numbers and designations in the various drawings indicate like elements.

DETAILED DESCRIPTION

Figure 1:
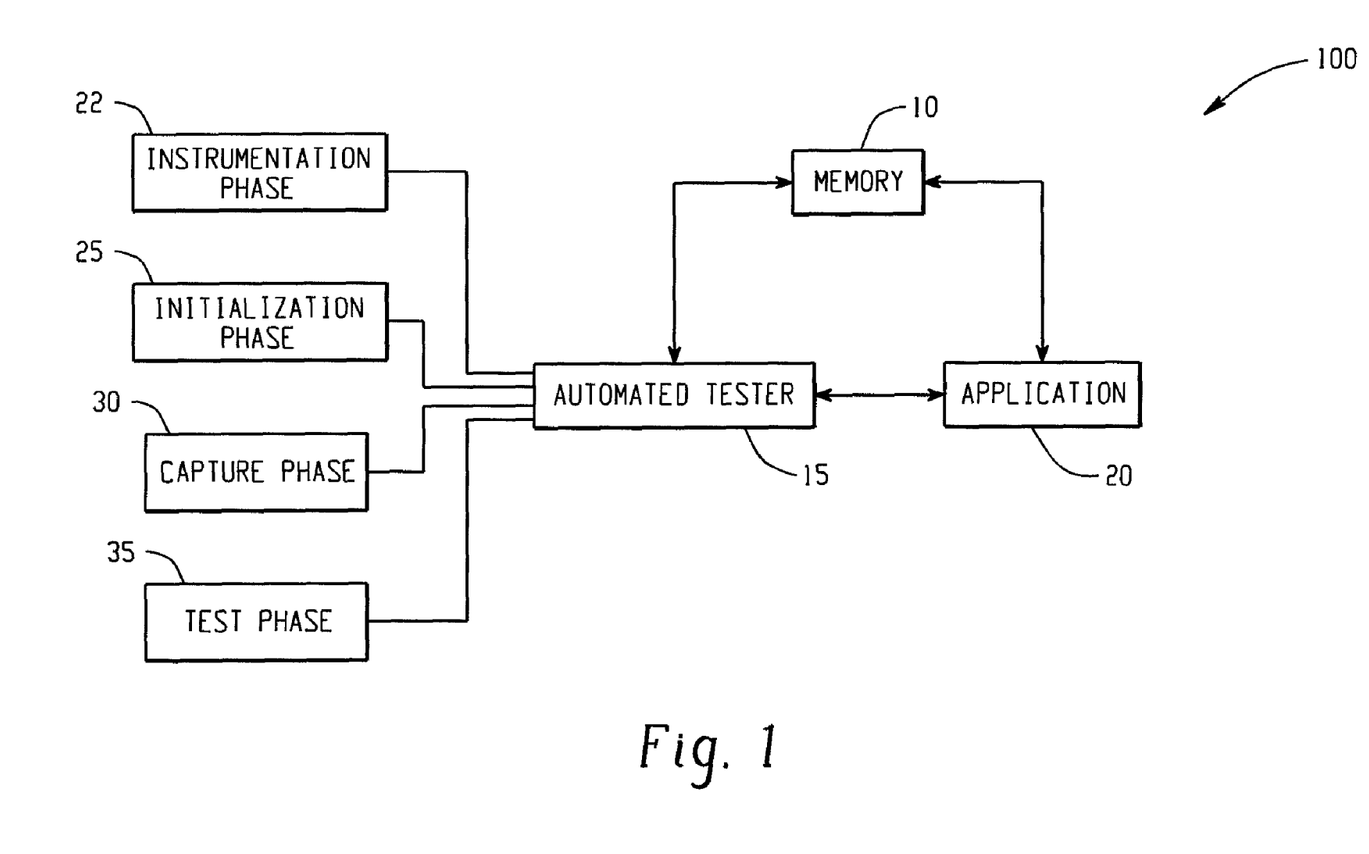
FIG. 1 shows a block diagram of example system components for automatically determining out of memory situations.

FIG. 1 depicts at 100 a system for testing an application 20 for out of memory handling situations. In the system 100, an automated tester 15 checks allocations of memory 10 by the application 20 in order to determine whether the application 20 handles out of memory situations correctly. If an out of memory situation occurs during the check, the automated tester 15 provides detection of the situation and reason(s) for why the situation occurred.

To provide detection and analysis of out of memory situations for the application 20, the automated tester 15 can be implemented in several phases, such as an instrumentation phase 22, initialization phase 25, a capture phase 30, and a test phase 35. An instrumentation phase 22 can insert code into application 20, such that application 20 is configured to capture every allocation and pool create in system 100. After application 20 is instrumented, the automated tester 15 can begin the initialization phase 25. During the initialization phase 25, the automated tester 15 can prime the system and perform any initialization needed (e.g., as required by a particular application being processed).

After the initialization phase 25, the automated tester 15 can signal the application 20 to begin the capture phase 30. During the capture phase 30, the application 20 captures one or more lines of code (e.g., a traceback), from each allocation and pool create in the system 100. A traceback can be one or more lines of code that can provide debugging information for system 100 using execution history data about program problems (e.g., a crash or a lock up). In some implementations, during the capture phase 30, the application 20 can capture a traceback comprising ten lines of code. In other implementations, during the capture phase 30, the application 20 can capture more than ten lines of code or can capture less than ten lines of code.

Upon completion of the capture phase 30, the system can compare the captured tracebacks, and the system can save the unique tracebacks (e.g., in memory 10). In some implementations, unique tracebacks can be determined automatically by the system as described herein. Still further in some implementations, the number of unique tracebacks can be set as a count. In some implementations, a filter (not shown) can be used to filter out or remove one or more tracebacks from the count (e.g., tracebacks that have already been tested or tracebacks with known crashes).

Upon completion of the capture phase 30, the system initiates the test phase 35 to simulate an out of memory condition. During the test phase 35 the automated tester 15 can re-submit the test a number of times that is equivalent to the count that was set during the capture phase 30. Additionally, the automated tester 14 can signal the application 20 regarding which instances of the unique tracebacks will be tested. During the test phase 35, in some implementations, the test can be restarted at least a number of times equivalent to the count. In some implementations the test can be restarted a number of times that is greater than the count. In this latter situation if the traceback is not found, then the system is stopped and then restarted so that the test for that iteration can be tried again. In some implementations, each restart of the test can be a new iteration of the test.

During the test phase 35, the application 20 can compare each captured traceback with a specific unique traceback. In some implementations, when the tracebacks match, a null pointer (e.g., from the memory allocation or pool creation routine), can be returned. Upon receiving a null pointer, the instrumented application 20 can allow the rest of the current iteration of the test execute. In these implementations, while the rest of the iteration of the test is executing, additional tracebacks are not checked.

Additionally, while the rest of the iteration of the test is executing, the application 20 can monitor and capture test results. For example, when the iteration of the test causes the application 20 to crash, a traceback of the crash (e.g., the current traceback), can be captured and saved in a file along with the traceback of the last allocation where a null pointer was returned (e.g., the exception traceback). In this example, the application 20 can write remaining untested unique tracebacks (e.g., unique tracebacks in the count which have not been tested), to a file and then the application 20 can terminate (e.g., using a "crash" code). The test phase 35 can include other types of out of memory analysis as described below with respect to example operational scenarios.

The test results can be reported and can include information about any crashes and lockups that occurred during the test phase 35. The test results can be saved to memory 10, saved to disc (not shown), printed, or otherwise made available for review. Reports can be useful to verify that all instances of memory allocation in the system have been checked. Reports can also provide reasons why an application ran out of memory and where the application ran out of memory. Additionally, reports can facilitate a determination regarding how the system will react to an out of memory situation before the occurrence of an out of memory situation.

The system 100 described above can be implemented in numerous configurations. For example, in some implementations, the automated tester 15 can be located on the same computer as the application 20 being tested. This configuration is described below respectively with reference to FIGS. 2 and 3.

Figure 2:
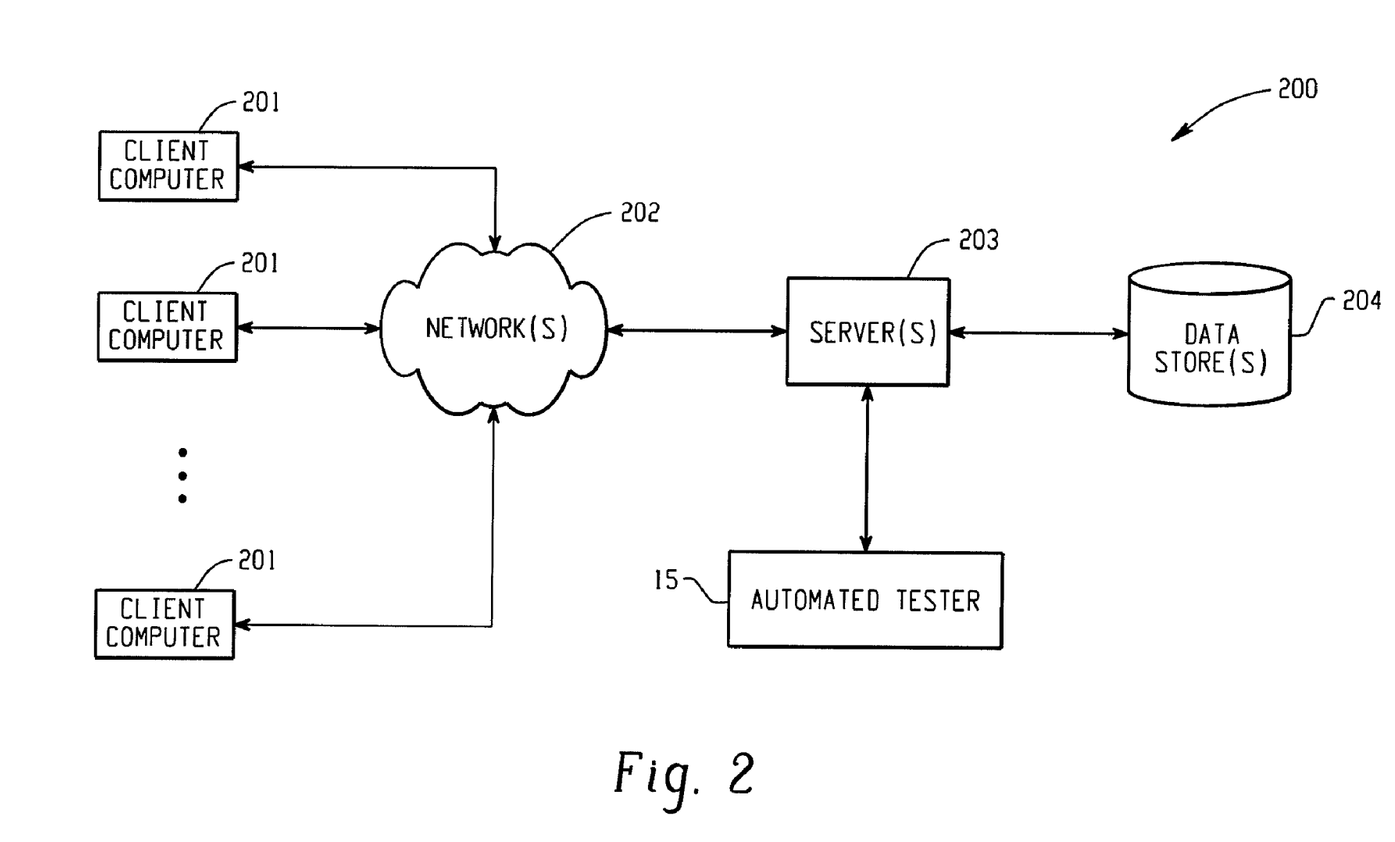
FIG. 2 shows a block diagram of an example system for automatically determining out of memory situations.

FIG. 2 shows a block diagram of an example system 200 for automatically determining out of memory situations. In some implementations, the automated tester 203 is located on the server(s) 203 and the application 20 (not shown) is also located on the server(s) 203. Users can interact with the system 200 through a number of ways, such as over one or more networks 202. One or more data stores 204 can store the data to be analyzed by the system 200 as well as any intermediate or final data generated by the system 200. Examples of networks 202 include a local area network ("LAN") and a wide area network ("WAN"), e.g., the Internet.

Figure 3:
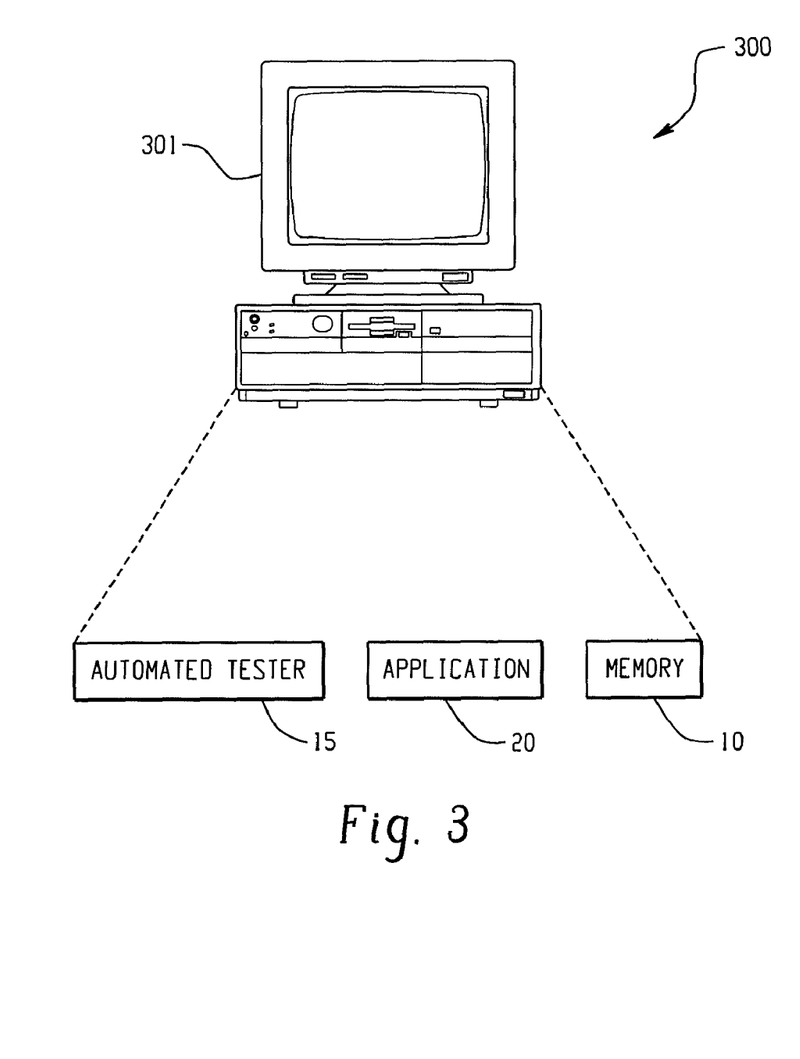
FIG. 3 shows a block diagram of another example system for automatically determining out of memory situations.

FIG. 3 shows a block diagram of another example system 300 for automatically determining out of memory situations. In system 300, a user can interact with the system 300 using a stand-alone computer 301 including a memory 10, an automated tester 15, and an instrumented application 20.

Figure 4A:
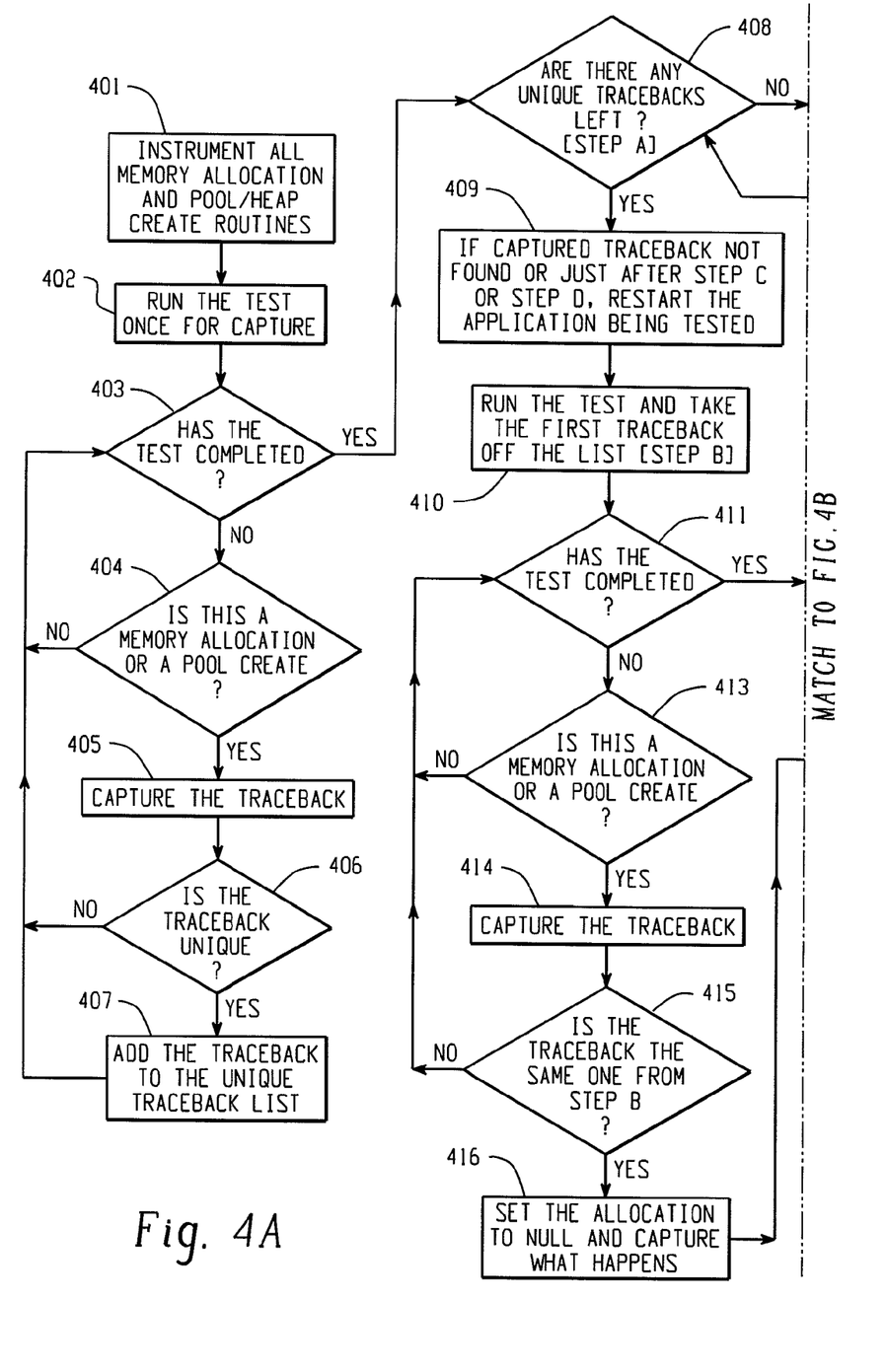
FIGS. 4A and 4B together show an example method for automatically determining out of memory situations.
Figure 4B:
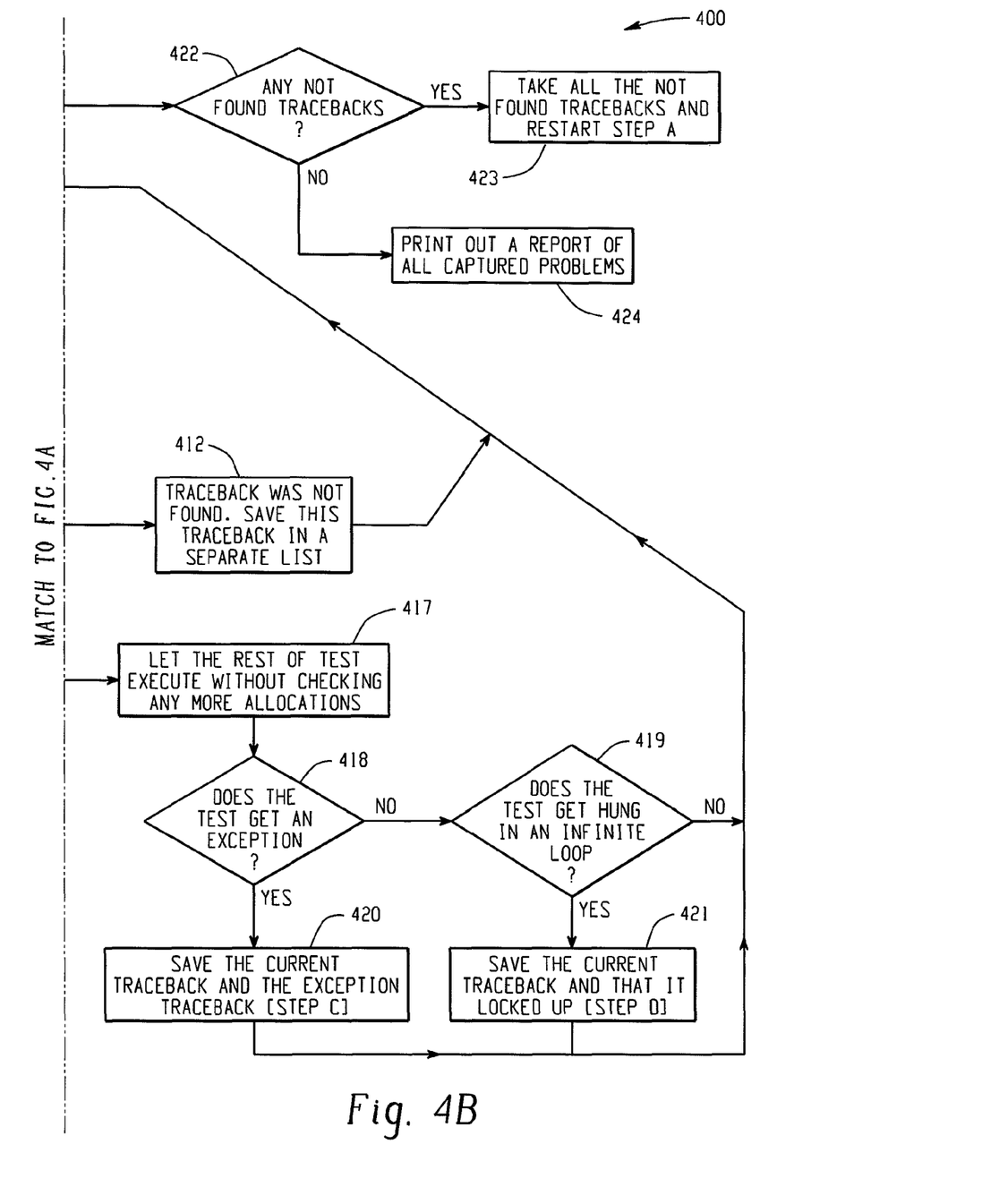

FIGS. 4A-4B together provide an example of an operational scenario 400 of an automated tester for automatically determining out of memory situations. Method 400 can begin with the instrumenting 401 of all memory allocation and pool/heap create routines. A first iteration of the test can then be run 402 to capture a traceback from each allocation and pool create in the system. During the first iteration of the test, a determination can be made as to whether the first iteration of the test has been completed 403.

If the first iteration of the test has not been completed, the application 20 can continue to determine if additional memory allocations or pool creates 404 exist which need to be tested. If no additional memory allocations or pool creates 404 exist which need to be tested, then a determination can be made again as to whether the first iteration of the test has been completed 403. If additional memory allocations (or pool creates) 404 exist which need to be tested, the application 20 can capture a traceback 405 for each remaining memory allocation and pool create 404 needing to be tested. Additionally, the application 20 can determine whether each captured traceback is unique 406, as described above. If the application 20 does not determine that a captured traceback is unique 406, the application 20 can continue to determine if additional memory allocations (or pool creates) 404 exist which need to be tested. If the application determines that a captured traceback is unique 406, the application can add that traceback to a unique traceback list (e.g., the count) 407, and then application 20 can continue to determine if additional memory allocations (or pool creates) 404 exist which need to be tested.

If the first iteration of the test has been completed, the application 20 can determine whether any unique tracebacks exist (e.g., on the list) which need to be tested 408 (e.g., Step A). If a unique traceback on the list needs to be tested 408, the application 20 can run a next iteration of the test to compare each captured traceback 405 with a unique traceback 406. If no captured traceback 405 is found to match the unique traceback 406 being tested during the next iteration, the application 20 can save the unique traceback 406 (e.g., on another list 412), and the application 20 can be restarted 409. Once restarted, the application 20 can subsequently proceed to run a next iteration of the test 410 using the first traceback on the list 407 (e.g., Step B). When the next iteration of the test 410 is run using the first traceback on the list, the first trackback can be taken off the list 410 (e.g., thus reducing the count by one).

After the next (or now "current") iteration of the test is run 410, the application 20 can determine if the current iteration of the test ran to completion 411. If the current iteration of the test has run to completion, the application 20 can determine whether a captured traceback 405 was found. As noted above, if no captured traceback 405 is found to match the unique traceback 406 being tested during the next iteration, the application 20 can save the unique traceback 406 (e.g., on another list 412), and the application 20 can be restarted 409. Once restarted, the application 20 can subsequently proceed to run a next iteration of the test using the first traceback on the list 410 (e.g., Step B).

If the current iteration of the test has not run to completion, the application 20 can determine whether a memory allocation (or pool create) exists for which a traceback was not captured 413. If no memory allocation (or pool create) exists for which a traceback has not been tested, the application 20 can subsequently determine whether the current iteration of the test has run to completion 411.

If a memory allocation (or pool create) exists for which a traceback has not been captured, the application 20 can proceed to capture that traceback 414 and compare it to the unique traceback 406 being tested. If the application 20 does not determine that a captured traceback 405 matches the unique traceback 406 being tested (the traceback from step B), the application 20 can subsequently determine 415 whether the current iteration of the test has run to completion 411. If the application 20 does determine 415 that a captured traceback 405 matches the unique traceback 406 being tested, the application 20 can set a "null" allocation 416 with respect to the unique traceback 406. Additionally, the application 20 can allow the remainder of the current iteration of the test to execute 417 (e.g., without checking any further allocations of unique tracebacks 406 on the list).

While the remainder of the current iteration of the test is running, the application 20 can monitor the test to determine whether the current iteration of the test gets an exception 418 (e.g., crashes). If the current iteration of the test does not get an exception 418, in some implementations, the application 20 can next determine if the current iteration of the test gets hung in an infinite loop 419 (e.g., gets locked up). If the current iteration of the test does not get hung in an infinite loop 419, in some implementations, the application 20 can next determine if any unique tracebacks 406 are left to be tested 408 (step A).

If the current iteration of the test gets an exception 418, the application 20 can save the unique traceback being tested (i.e., the current traceback being tested) along with a traceback of the exception 420 (step C). In some implementations, the application 20 can next determine if any unique tracebacks 406 are left to be tested 408 (step A). Additionally, if application 20 determines that unique tracebacks 406 are left to be tested 408, the application 20 can be restarted 409 and subsequently run the next iteration of the test using the first traceback off the list 410.

If the current traceback gets hung in an infinite loop 419, the application 20 can save the unique traceback (i.e., the current traceback being tested) along with information indicating that the current traceback locked up during the test 421 (step D). In some implementations, the application 20 can next determine if any unique tracebacks 406 are left to be tested 408 (step A). Additionally, if application 20 determines that unique tracebacks 406 are left to be tested 408, the application 20 can be restarted 409 and subsequently run the next iteration of the test using the first traceback off the list 410.

If the application 20 determines 408 that the first iteration of the test has been completed, the application 20 can next determine 422 whether any unique tracebacks 406 exist (e.g., on list 412) for which captured tracebacks 405 were not found. If application 20 determines that a unique traceback 406 exists for which a captured traceback was not found, the application 20 can restart step A 423 using those unique tracebacks. Additionally, the application 20 can run the next iteration of the test 410 using those unique tracebacks 406. Alternatively, if the application 20 determines that no unique traceback 406 exists for which a captured traceback was not found, the application 20 can proceed to print out a report of all captured problems 424.

It should be understood that similar to the other processing flows described herein, the steps and the order of the steps in the flowchart described herein may be altered, modified, removed and/or augmented and still achieve the desired outcome. A multiprocessing or multitasking environment could allow two or more steps to be executed concurrently.

FIG. 5 shows an example display 500 of a test for specific tracebacks. In some implementations, a window 501 (e.g., a DOS window) can be used to implement instructions for executing an application (e.g., a Root Cause Interface Application or "RIA") and a file 502 (e.g., a configuration file for a null probe). The window can enumerate particular tracebacks to be tested (e.g., unique tracebacks). For example, an indication (e.g., only TKEDSExecute 503) can limit which tracebacks will be tested. In this example, only tracebacks that include "TKEDSExecute" will be executed.

Figure 6A:
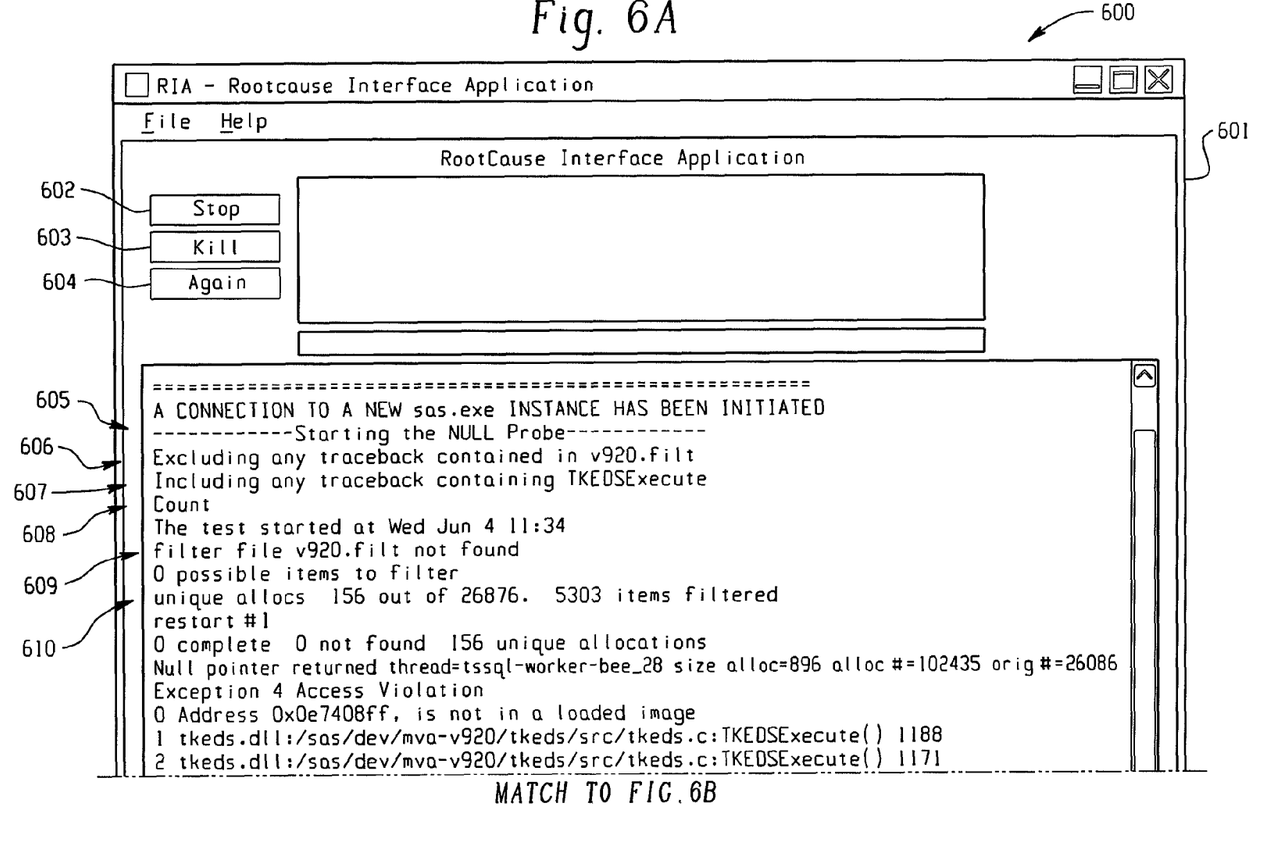
FIGS. 6A ans 6B together show an example display of an interface application window indicating the specific traceback tested.
Figure 6B:
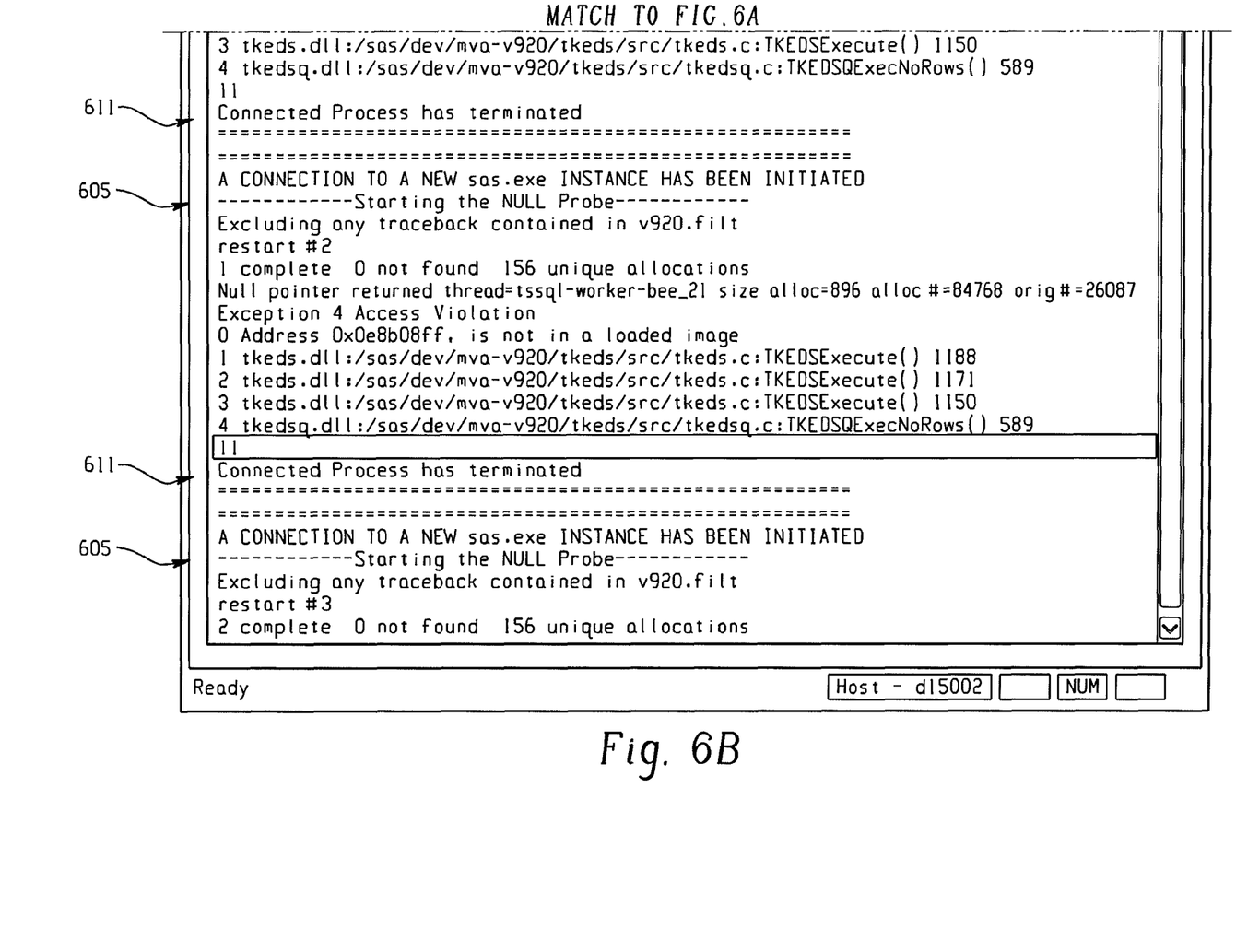

FIGS. 6A-6B together show an example display 600 of an interface application or RIA window 601 indicating the specific traceback being tested. In some implementations, the RIA window 601 can correspond to the RootCause Interface Application 502 executed in the DOS window 501. The RIA window can include one or more buttons (e.g., "stop" button 602, "kill" button 603, and "again" button 604), which can facilitate user interaction with the application. RIA window 601 includes an indication 605 that a process (e.g., the null probe) has started. Additionally, RIA window 601 includes an indication 606 that a filter (e.g., v920.filt) is being applied, and an indication 607 that only tracebacks containing "TKEDSExecute" will be considered "unique tracebacks." At 608, the RIA window 601 includes an indication that a count phase (which is part of the capture phase) will be run (e.g., to determine a number of unique allocations). Once the count phase has finished, the RIA window 601 includes an indication 609 that the filters are checked.

In RIA window 601, an indication 610 displays the results of the count phase. Specifically, 26,876 total allocations were tested, 5,303+156 unique allocations were discovered and 5,303 of those allocations were filtered (e.g., because they did not contain the "TKEDSExecute"). Additionally, RIA window 601 can include one or more indications 611 that an iteration of the test caused the application to terminate (e.g., by producing a crash). In some implementations, when the application terminates, a new version of the application can be started 605. In these implementations, the application can begin testing unique tracebacks from the point at which the application terminated during a last iteration of the test.

Figure 7A:
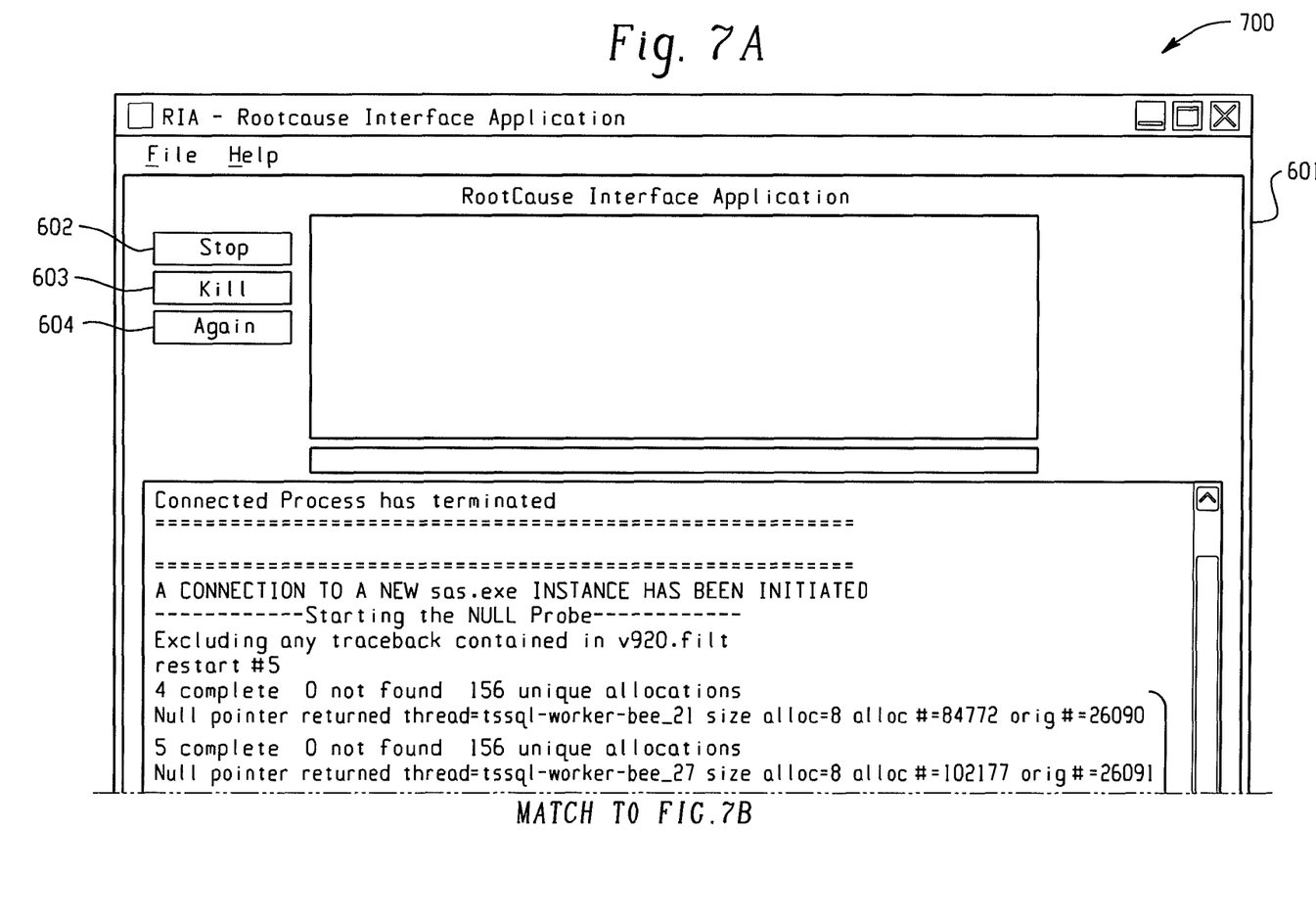
FIGS. 7A and 7B together show another example display of the interface application window including an incremental count of iterations being tested.
Figure 7B:
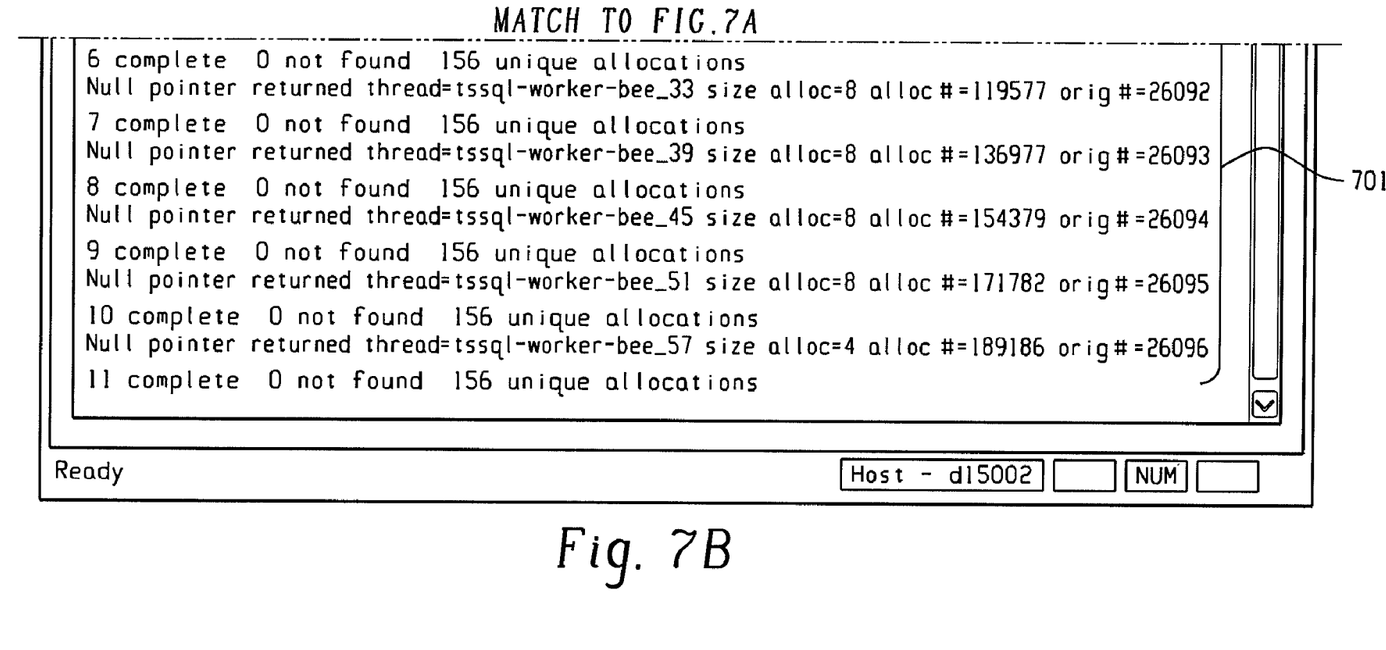
Figure 8A:
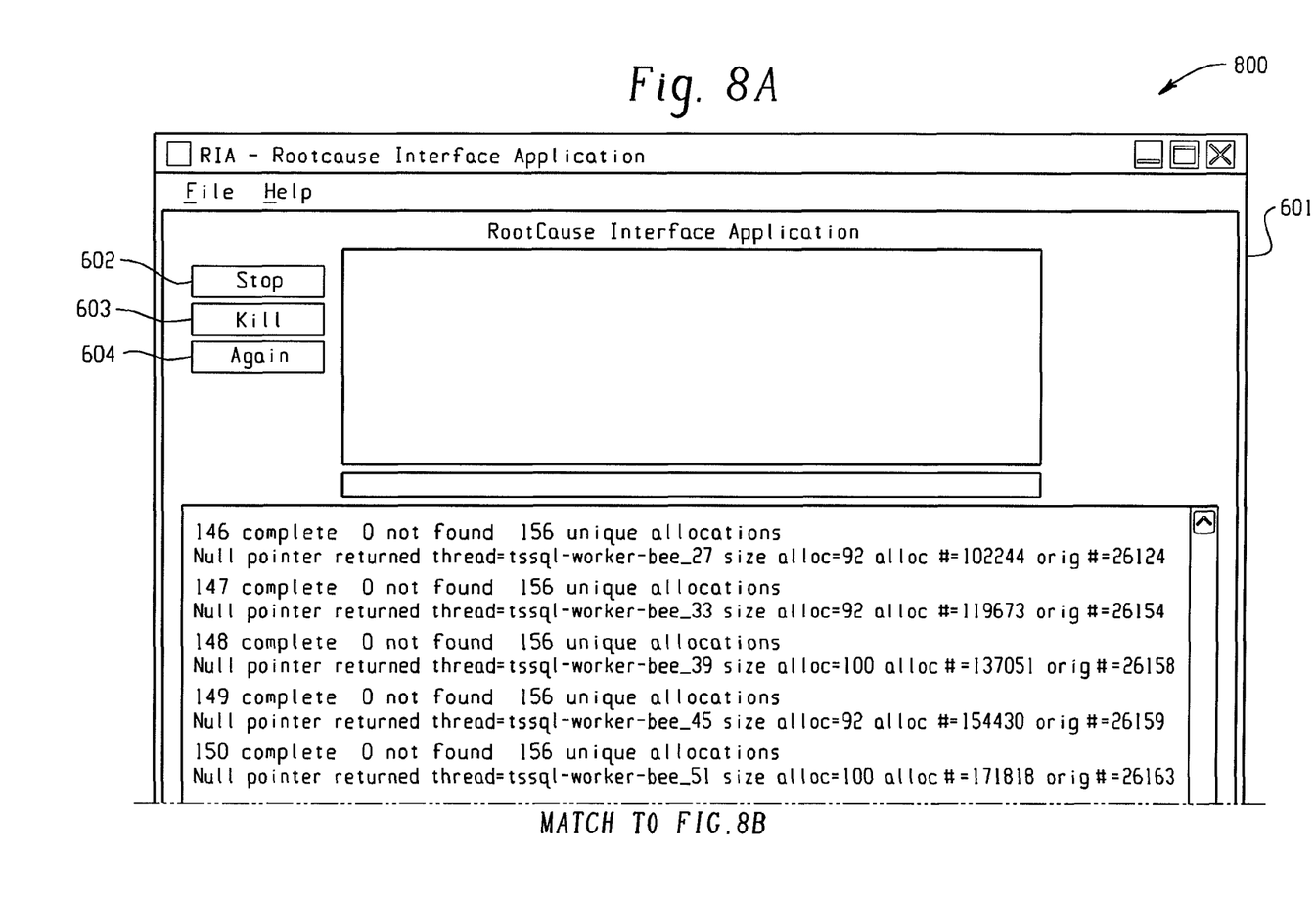
FIGS. 8A and 8B together show yet another example display of the interface application window including the last iteration tested.
Figure 8B:
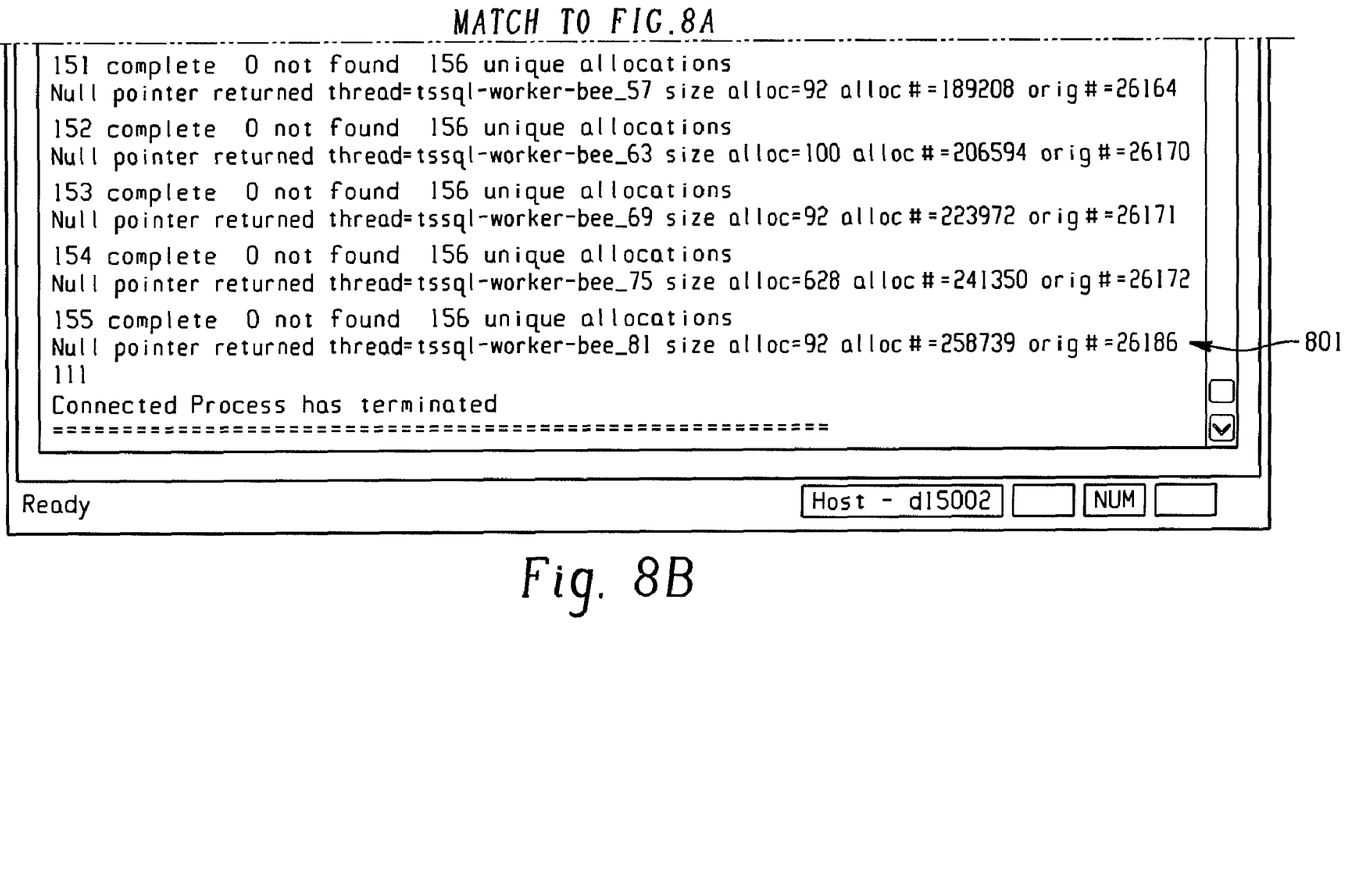

FIGS. 7A-7B together show another example display 700 of the interface application window 601 including an incremental count of iterations being tested. As noted with reference to REFS. 6A and 6B above, 26,876 total allocations were tested during the count phase. As shown in FIGS. 7A-7B, following a first few iterations of the test which caused the application to terminate, subsequent iterations of the test do not cause the application to terminate. Additionally, as shown in RIA window 601, each subsequent successful iteration of the test can allow the count to increment 701. In some implementations, the count will continue to increment until the count matches the total number of allocations tested during the count phase (i.e., 26,876). FIGS. 8A-8B shows yet another example display 800 of the interface application window 601 including the last iteration tested 801.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus.

The computer-readable medium can be a machine-readable storage device, a machine-readable storage substrate, a memory device 10, a composition of matter effecting a machine-readable propagated signal, or a combination of one or more of them. The systems' and methods' data (e.g., associations, mappings, data input, data output, intermediate data results, final data results, etc.), may be stored and implemented in one or more different types of computer-implemented data stores, such as different types of storage devices and programming constructs, such as data structures. It is noted that data structures describe formats for use in organizing and storing data in databases, programs, memory, or other computer-readable media for use by a computer program.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them, A propagated signal is an artificially generated signal, e.g., a machine-generated electrical, optical, or electromagnetic signal, that is generated to encode information for transmission to suitable receiver apparatus.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few.

The methods and systems described herein may be implemented on many different types of processing devices by program code comprising program instructions that are executable by the device processing subsystem. The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

The computer program instructions may include source code, object code, machine code, or any other stored data that is configured to cause a processing system to perform the methods and operations described herein. Other implementations may also be used, however, such as firmware or even appropriately designed hardware configured to carry out the methods and systems described herein. A computer program (also known as a program, software, software application, script, or code), can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The invention claimed is:

1. A computer-implemented method for automated determination of out of memory situations, comprising:
    receiving, using one or more processors, data including one or more memory allocations or one or more pool heap allocations;
    running a first test on the data to capture one or more first tracebacks where a memory allocation or pool heap allocation occurs;
    determining whether each captured first traceback is unique, wherein unique tracebacks are added to a unique traceback list;
    simulating an out of memory condition for each unique traceback on the unique traceback list by repeatedly running a second test, wherein the second test is run once for each unique traceback; wherein one or more second tracebacks are captured during each run of the second test, and wherein when a unique traceback being tested matches a captured second traceback, an out of memory error code is returned and the second test is run to completion; and
    identifying errors encountered during each iteration of the second test.

2. The method of claim 1, wherein running the second test includes capturing a second traceback for each memory allocation or each pool heap allocation encountered while running the second test.

3. The method of claim 2, wherein simulating an out of memory condition includes returning a null value when the unique traceback being tested matches a captured second traceback.

4. The method of claim 3, wherein when no captured second traceback matches the unique traceback being tested, the unique traceback list is saved and the second test is terminated.

5. The method of claim 1, wherein a traceback is at least ten lines in length.

6. The method of claim 1, further comprising:
filtering one or more first tracebacks from the unique traceback list prior to simulating the out of memory.

7. The method of claim 1, further comprising:
saving the unique traceback list.

8. The method of claim 1, further comprising:
testing an application on each run of the second test;
wherein the application is restarted for each run of the second test.

9. The method of claim 1, further comprising:
determining a crash, wherein when a crash is determined, a crash traceback is captured and saved, the unique traceback list is saved, and current run of the second test is terminated using a crash code.

10. The method of claim 1, further comprising:
determining a lock up, wherein when a lock up is determined, the unique traceback list is saved, and the second test is terminated using a lock up code.

11. The method of claim 1, wherein running the second test includes determining a result including a crash or a lock up.

12. The method of claim 11, further comprising:
determining a reason for the result; and
storing the reason for the result.

13. The method of claim 1, wherein the processor-implemented system includes a client-server based system or a stand-alone computer based system.

14. The method of claim 1, further comprising:
determining a reason for a crash or a lock up by analyzing one or more of the captured second tracebacks when a crash or a system lock up occurs.

15. The method of claim 14, wherein the reason indicates a crash or a lock up resulting from an improperly handled null pointer.

16. A computer-program product, tangibly embodied in a machine-readable storage medium, including instructions operable to cause a data processing apparatus to perform a method for automated determination of out of memory situations, the method comprising:
receiving, using one or more processors, data including one or more memory allocations or one or more pool heap allocations;
running a first test on the data to capture one or more first tracebacks where a memory allocation or pool heap allocation occurs;
determining whether each captured first traceback is unique, wherein unique tracebacks are added to a unique traceback list;
simulating an out of memory condition for each unique traceback on the unique traceback list by repeatedly running a second test, wherein the second test is run once for each unique traceback; wherein one or more second tracebacks are captured during each run of the second test, and wherein when a unique traceback being tested matches a captured second traceback, an out of memory error code is returned and the second test is run to completion; and
identifying errors encountered during each iteration of the second test.

17. A system, comprising:
one or more processors;
one or more computer-readable storage mediums containing instructions configured to cause the one or more processors to perform operations for automated determination of out of memory situations, comprising:
receiving, using one or more processors, data including one or more memory allocations or one or more pool heap allocations;
running a first test on the data to capture one or more first tracebacks where a memory allocation or pool heap allocation occurs;
determining whether each captured first traceback is unique, wherein unique tracebacks are added to a unique traceback list;
simulating an out of memory condition for each unique traceback on the unique traceback list by repeatedly running a second test, wherein the second test is run once for each unique traceback; wherein one or more second tracebacks are captured during each run of the second test, and wherein when a unique traceback being tested matches a captured second traceback, an out of memory error code is returned and the second test is run to completion; and
identifying errors encountered during each iteration of the second test.

\* \* \* \* \*